US009709406B2

(12) United States Patent
Bastiaensen et al.

(10) Patent No.: US 9,709,406 B2
(45) Date of Patent: Jul. 18, 2017

(54) NAVIGATION METHODS AND SYSTEMS

(75) Inventors: Edwin Bastiaensen, Beersel (BE);
Stephen T'Siobbel, Merelbeke (BE)

(73) Assignee: TomTom Navigation B.V., Amsterdam (NL)

( * ) Notice: Subject to any disclaimer, the term of this patent is extended or adjusted under 35 U.S.C. 154(b) by 285 days.

(21) Appl. No.: 13/977,786

(22) PCT Filed: Dec. 31, 2010

(86) PCT No.: PCT/EP2010/070970
§ 371 (c)(1),
(2), (4) Date: Jul. 1, 2013

(87) PCT Pub. No.: WO2012/089282
PCT Pub. Date: Jul. 5, 2012

(65) Prior Publication Data
US 2013/0275033 A1 Oct. 17, 2013

(51) Int. Cl.
*G01C 21/26* (2006.01)
*G01C 21/36* (2006.01)
(Continued)

(52) U.S. Cl.
CPC ......... *G01C 21/26* (2013.01); *G01C 21/3658* (2013.01); *G08G 1/052* (2013.01); *G08G 1/096861* (2013.01)

(58) Field of Classification Search
CPC .. G08G 1/052; G08G 1/096861; G01C 21/26; G01C 21/3658
(Continued)

(56) References Cited

U.S. PATENT DOCUMENTS 6,556,916 B2   4/2003   Waite et al.
6,850,841 B1 * 2/2005   Casino .................. 701/461
                        (Continued)

FOREIGN PATENT DOCUMENTS

JP   2001082975 A   3/2001
JP   2006105686 A   4/2006
                   (Continued)

OTHER PUBLICATIONS

Du, J., et al. "Lane-Level Positioning for In-Vehicle Navigation and Automated Vehicle Location (AVL) Systems," 2004 IEEE Intelligent Transportation Systems Conference, Washington, D.C., Oct. 3-6, 2004, pp. 35-40.
(Continued)

*Primary Examiner* — McDieunel Marc
*Assistant Examiner* — James E Stroud

(57) ABSTRACT

Lane speed profiles are determined for each of a plurality of individual lanes of a multi-lane road section. The plurality of individual lanes are lanes for a given direction of travel. The lane speed profiles are determined using real-time vehicle probe data. The speed profiles are used to determine a timing for provide an instruction to a user of a navigation apparatus to change lane. The timing may be determined to provide a quickest route through at least a part of the road section, to increase the time available for the user to perform the lane change, or to enable a user to pass an incident affecting a lane most quickly.

16 Claims, 5 Drawing Sheets

(51) Int. Cl.
*G08G 1/052* (2006.01)
*G08G 1/0968* (2006.01)

(58) Field of Classification Search
USPC .......................................................... 701/119
See application file for complete search history.

(56) References Cited

U.S. PATENT DOCUMENTS

| | | | |
|---|---|---|---|
| 7,085,633 | B2 | 8/2006 | Nishira et al. |
| 7,124,023 | B2* | 10/2006 | Peeters ..................... 701/423 |
| 7,219,012 | B2 | 5/2007 | Yoshikawa |
| 7,336,666 | B1* | 2/2008 | Grivna .................... 370/395.51 |
| 7,370,132 | B1* | 5/2008 | Huang et al. ................. 710/307 |
| 7,627,806 | B1* | 12/2009 | Vijayaraghavan et al. .. 714/807 |
| 7,711,485 | B2 | 5/2010 | Matsumoto |
| 7,930,095 | B2* | 4/2011 | Lee ............................... 701/119 |
| 8,050,854 | B1* | 11/2011 | Chandra et al. ............. 701/117 |
| 8,335,641 | B2† | 12/2012 | Nakayama |
| 8,484,002 | B2* | 7/2013 | Yang et al. ....................... 703/8 |
| 2004/0107030 | A1* | 6/2004 | Nishira ................. B60W 40/02 701/36 |
| 2006/0220913 | A1 | 10/2006 | Krautter et al. |
| 2007/0050133 | A1 | 3/2007 | Yoshikawa |
| 2007/0067100 | A1 | 3/2007 | Matsumoto |
| 2007/0100537 | A1 | 5/2007 | Parikh et al. |
| 2007/0225907 | A1 | 9/2007 | Oonishi et al. |
| 2008/0010002 | A1 | 1/2008 | Dekock et al. |
| 2008/0033632 | A1 | 2/2008 | Lee |
| 2009/0326814 | A1 | 12/2009 | Harumoto et al. |
| 2010/0036595 | A1 | 2/2010 | Coy et al. |
| 2010/0063715 | A1† | 3/2010 | Wynter |
| 2010/0268453 | A1 | 10/2010 | Otani et al. |
| 2010/0299055 | A1 | 11/2010 | Hilbrandie et al. |
| 2011/0010088 | A1 | 1/2011 | Nagase |

FOREIGN PATENT DOCUMENTS

| | | |
|---|---|---|
| JP | 2008298547 A | 12/2008 |
| JP | 2010236996 A | 10/2010 |
| JP | 2011501173 A | 1/2011 |
| WO | 2009053405 | 4/2009 |
| WO | 2009122643 A1 | 10/2009 |
| WO | WO2009122643 A1 | 10/2009 |
| WO | WO2010081836 A1 | 7/2010 |

OTHER PUBLICATIONS

"CoVeL—Cooperative Vehicle Localization for Efficient Urban Mobility," 1 page, from www.covel-project.eu on Dec. 27, 2010, accessed via www.archive.org on Apr. 9, 2014.

Jie Du et al: "Next Generation Automated Vehicle Location Systems: Positioning at the Lane Level", IEEE Transactions on Inteligent Transportation Systems, IEEE, Piscataway, NJ, USA, vol. 9, No. 1, pp. 48-57 XP011202485.

International Search Report issued Sep. 23, 2011 for International Application No. PCT/EP2010/070969.

International Search Report issued Sep. 26, 2011 for International Application No. PCT/EP2010/070970.

Du, J., et al., "Lane-Level Positioning for In-Vehicle Navigation and Automated Vehicle Location (AVL) Systems," 2004 IEEE Intelligent Transportation Systems Conference, Washington, D.C., Oct. 3-6, 2004, pp. 35-40.†

"CoVeL—Cooperative Vehicle Localization for Efficient Urban Mobility," 1 page, from www.covel-project.eu on Dec. 27, 2010, accessed via www.archive.org on Apr. 9, 2014.†

\* cited by examiner
† cited by third party

NAVIGATION METHODS AND SYSTEMS

CROSS-REFERENCES TO RELATED APPLICATIONS

This application is the National Stage of International Application No. PCT/EP2010/070970 filed Dec. 31, 2010 and designating the United States. The entire content of this application is incorporated herein by reference.

FIELD OF THE INVENTION

This invention relates to methods and systems for providing lane level guidance to users of navigation devices. Illustrative embodiments of the invention relate to portable navigation devices (so-called PNDs), in particular PNDs that include Global Positioning System (GPS) signal reception and processing functionality, and to systems and methods involving such devices. The invention is also applicable to a navigation apparatus which forms part of an integrated navigation system, e.g. an in-vehicle navigation system, and to systems and methods using such apparatus.

BACKGROUND TO THE INVENTION

The present invention is directed to methods and systems of providing lane level guidance to users of navigation apparatus. The apparatus may be of any suitable form as discussed above, and in more detail below. One illustrative embodiment of the apparatus is a portable navigation device. Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO950 LIVE model manufactured and supplied by TomTom International B.V., provide a reliable means for enabling users to navigate from one position to another.

While navigation systems are of great utility in providing route guidance, and traffic information, the Applicant has identified that further improvements in relation to providing lane level guidance to users of navigation apparatus would be desirable. Navigation systems may provide information regarding the number of lanes present in a given road section, particularly in the region of an interchange, and may provide guidance to the user as to which is the appropriate lane for a given destination. However, the information provided is limited to information regarding the appropriate exit lane for a given destination. The Applicant has realised that drivers often make lane changes other than when required to follow a particular route e.g. to follow a particular exit or entry. For example, a driver may feel that another lane is moving faster in a region of congested traffic, prompting them to change lane. It is known that it is undesirable for overall traffic flow for drivers to repeatedly change lane, and such behaviour may increase the risk of dangerous situations developing, and increase the stress level of drivers. A driver may switch to an apparently faster moving lane only to find shortly that the lane is moving slower than other lanes e.g. because there are many trucks in it.

The present invention is directed to the problem of providing improved lane level guidance via a navigation apparatus.

SUMMARY OF THE INVENTION

In accordance with a first aspect of the invention there is provided a method comprising the steps of;

determining lane speed information for each of a plurality of individual lanes of a multi-lane road section, wherein the plurality of individual lanes are lanes for the same given direction of travel, and using the lane speed information to determine a timing for providing a lane selection instruction to a user of a navigation apparatus.

In accordance with a second aspect of the present invention there is provided a system comprising;

means for determining lane speed information for each of a plurality of individual lanes of a multi-lane road section, wherein the plurality of individual lanes are lanes for the same given direction of travel, and means for using the lane speed information to determine a timing for providing a lane selection instruction to a user of a navigation apparatus.

If not explicitly stated herein, the system of the invention may comprise means for carrying out any of the method steps described, and the method may comprise carrying out any of the steps the system is stated to be arranged to perform. References to a system or apparatus comprising "means for" carrying out any step may be replaced by a reference to there being a set of one or more processors for carrying out the step. Thus any step may be carried out using a set of one or more processors.

The present invention therefore relates to methods and systems in which lane speed information is used to determine a timing for providing an instruction to a user of a navigation apparatus regarding a lane selection.

As used herein, a "lane" refers to one of the strips into which the carriageway of the road is demarcated in a given direction. A lane is a part of a carriageway which is intended to be used by a single line of vehicles.

The lane speed information may be of any type. The lane speed information relates to the speed of flow of traffic in a direction along the length of each of the plurality of lanes. Thus the lane speed is a lane traffic speed. The lane speed relates to the longitudinal speed of traffic along the lane. The lane speed information is determined for each of the plurality of lanes and is specific to a given lane. In accordance with the invention, lane speed information is determined for each of a plurality of same direction lanes i.e. lanes belonging to the same carriageway of the road section.

The lane speed information may be determined in any manner, and using any form of data. In embodiments the lane speed information for each lane is determined using data relating to the movement of each of a plurality of individual vehicles along the lane. The data is traffic data. The data may be data which directly or indirectly allows vehicle speeds to be determined. The data may be vehicle speed data, or data enabling vehicle speed data to be derived. For example the data may be data relating to the position of vehicles with respect to time.

Preferably the lane speed information for a lane is determined using sensor data. The data may be obtained from conventional traffic sensors. For example, lane speed information may be derived from data sensed by cameras, loops etc. The sensor data may be derived using data obtained using fixed sensors.

In preferred embodiments the lane speed information is determined using, at least in part, and in some embodiments only, vehicle probe data. Of course, the lane speed information may be determined using a combination of vehicle probe and other data, e.g. vehicle probe data and fixed sensor data.

Any references to "probe data" herein refer to vehicle probe data unless the context demands otherwise. As used herein, the term "vehicle probe data" takes on its customary meaning in the art. Vehicle probe data refers to data obtained from probe devices associated with individual vehicles. Thus the individual vehicles act as traffic sensors. A probe device is a device that is capable of determining its position at different times, and providing information about its position at different times to a central controller. For example, the probe device may upload its position with a timestamp to the central controller for different times. In this way the central controller is provided with position data for the probe device at different times which may be used to obtain a "trace" of the path taken by the device. In embodiments a central controller therefore collects individual position traces for each of a plurality of probe devices associated with probe vehicles. The position data is typically GPS position data for the device. For example, in some systems, the position of the probe device may be uploaded to a central controller every 5 seconds with a timestamp.

In accordance with the invention the probe data includes data enabling a vehicle speed to be determined. The data may include speed data, or data which may be used to derive speed data, i.e. position data, such as GPS or GSM position data, and time data. Such data may be obtained from any type of probe device associated with a vehicle, e.g. from vehicles provided with a specific position sensor, from a stand alone or in built navigation apparatus located in the vehicle, or from mobile communication devices located in the vehicle e.g. a mobile phone of an occupant of the vehicle which can act as a position sensor, or using any other permanent or temporary vehicle based apparatus that may act as a sensor providing data which may be used directly or indirectly to obtain a vehicle speed.

In preferred embodiments the probe data comprises time and position data obtained from probe devices. The time and position data may be in the form of a probe trace for a probe device. The data is preferably received by a central controller. A probe device may provide the position and time information to a central controller in any manner. The device may automatically and periodically determine position and time information and upload the position and time information to the central controller. For example, position information may be uploaded with a time stamp for different times. In these arrangements, the device may upload the information in real-time, i.e. periodically provide position information to the central controller for a current time e.g. via a wireless communications means, or may store the information locally and upload it to the remote central controller at intervals, or upon request of the central controller, upon user intervention etc. In some arrangements the probe device could store position information and upload the position information to a central controller only when suitably connected thereto e.g. when connected to a computer, or when the vehicle is at a charging location etc. Uploading may occur automatically or only on intervention of a user. In these arrangements the data may be uploaded at different times with a time stamp. This will enable a probe trace to be determined by a central controller. In embodiments, the system therefore comprises a central controller.

In some preferred embodiments, the step of determining lane speed information for a lane comprises determining a lane speed profile for the lane. The step of determining lane speed information or a lane speed profile is preferably carried out by a central controller. The central controller may be arranged to carry out any of the steps for determining lane speed information or profiles.

A "lane speed profile" as used herein refers to a profile for the speed of flow of traffic in a direction along the lane for the road section. Thus the lane speed profile is a lane traffic speed profile. The lane speed profile is a profile relating to the longitudinal speed of traffic along the lane. It will be appreciated that each lane speed profile will relate to a length of the lane over at least a part of the road section or the entire length of the road section. Thus the typical speed of traffic flow along the lane may vary over the length of the lane considered, such that the speed profile may reflect a varying typical speed over the length of the lane to which the profile relates e.g. depending upon the existence of exits, entries etc affecting the lane. The speed profile may therefore be a profile of speed with respect to distance along the length of the lane. The lanes for which the lane speed profiles are determined are preferably at least partially coextensive along their length.

In embodiments in which a lane speed profile is determined, the method preferably comprises using vehicle probe data to determine the lane speed profile. In some embodiments the method further comprises obtaining vehicle probe data for processing to determine lane speed profiles, and preferably comprises collecting the vehicle probe data. The system may then comprise means for so doing. For example, a central controller may be arranged to carry out such steps. However, the vehicle probe data may be obtained in any manner. For example, the data may be data which has been collected and stored for another purpose, and the method of the invention may then involve processing already collected data.

The method may comprise collecting the vehicle probe data at a central controller for processing in order to determine the lane speed profiles, and the system may comprise a central controller for collecting the data for processing. The probe data may be transmitted from individual vehicles for collection e.g. to a central controller. The data may be transmitted directly or indirectly to the central controller. For example, the data may be collected at a regional controller and forwarded to a central controller for processing with data from other regional controllers. In some embodiments therefore, the step of using the vehicle probe data to obtain the lane speed profiles is carried out by a central controller e.g. a set of one or more processors thereof. However, equally it is envisaged that the data could be collected and/or processed to determine lane speed profiles in other manners, e.g. by local navigation apparatus, or individual navigation devices having suitable processing power, or by combinations of navigation apparatus and a central controller or any other apparatus.

The method may further comprise storing the vehicle probe data to be used in determining the lane speed profiles. The data may be stored by a central controller. The vehicle probe data may be stored locally or remote to a processor which determines the lane speed profiles. It will be appreciated that processing and/or storage of data may occur in multiple locations.

In embodiments the method comprises using probe vehicle data relating to the movement of each of a plurality of individual vehicles along each lane to obtain a lane speed profile, and the system comprises means for so doing. The vehicle probe data used to determine each lane speed profile comprises data which may be used to determine an overall traffic speed for the given lane. The data relates to the movement of a plurality of individual vehicles along the given lane. Thus the data may be lane level longitudinal speed data for individual vehicles or enables such data to be determined. The vehicle probe data may comprise speed data for each of a plurality of individual vehicles travelling along each lane, or data enabling speed data for each of a plurality of individual vehicles travelling along each lane to be determined. The data therefore enables speed data for individual vehicles to be directly or indirectly determined. For example, the probe data may comprise speed data, or may comprise data relating to the position of each individual vehicle with respect to time. Probe points and associated times may be used to determine a speed of travel of a probe vehicle. In some embodiments the vehicle probe data comprises position traces representing the position e.g. GPS position of individual vehicles travelling along each lane for which a lane speed profile is determined with respect to time i.e. longitudinal vehicle probe traces.

It will be appreciated that only data e.g. probe data relating to vehicles in a given lane is used to determine the lane speed profile for the lane. Thus each lane speed profile is determined using probe data relating to vehicle speeds in only a single lane.

Lane speed profiles may be derived using techniques similar to those used to determine speed profiles at a road level i.e. non lane level speed profiles. For example, some methods are described in the Applicant's co-pending WO 2009/053405A1, entitled "Method and Machine for Generating Map Data and Method and Navigation Device for Determining a Route using Map Data."

It will be appreciated that the techniques of the invention may require knowledge of the lane structure of the road section in at least the given direction of travel. The lane structure information may include the number of lanes in the road section and/or a lane width for each lane. Lane structure information may be obtained in any manner. For example, existing lane level map data may be used. Lane level digital map data is already used to provide guidance to road users regarding lane selection to reach a particular destination.

In embodiments in which lane speed profiles are determined using vehicle probe data, the step of determining the lane speed profiles may comprise determining to which lane vehicle probe data relates, and the system may comprise means for so doing. The method may comprise assigning vehicle probe data to each lane for which a lane speed profile is to be determined. For example, in embodiments, vehicle probe information may be collected which relates to all vehicles travelling along the road section in one or both directions. In order to determine a speed profile for a given lane of the road section in a given direction it may first be necessary to determine which data relates to vehicles in the lane of interest.

This may be done using lane structure information for the road section i.e. information regarding the position of the lanes in the road section. Data describing the lane structure of road sections is readily available, and it has been found that probe vehicle data may describe the position of vehicles to a degree of accuracy which enables it to be determined in which lane a vehicle is travelling. Alternatively, vehicle probe data may itself be used to determine lane structure information by consideration of a distribution of probe traces across a width of the road section.

In accordance with the invention in any of its embodiments, the method may further comprise aggregating data relating to the speeds of each of a plurality of individual vehicles along a lane to obtain the lane speed profile for the lane, and the system comprises means for carrying out such a step. The speed data may be probe data or data derived using probe data. The data may be averaged in any manner.

In embodiments, individual vehicle probe traces may be processed together, e.g. by determining clusters of traces that relate to the same lane. The term "cluster" refers to the assignment of a population of observations into subsets, each subset being similar in one or more respects. For example, in this context, the clusters of traces share spatial similarities, e.g. a spatial correlation of observations or a grouping of observations having a minimum density. In some embodiments the method therefore comprises determining clusters of vehicle probe traces that relate to vehicles in the same lane, and using the cluster of vehicle probe traces in determining a lane speed profile for the lane. The clustering may be by reference to the speeds of probe vehicles and/or a position across the width of a road.

It will be appreciated that in accordance with the invention, the lane speed information may be determined using real-time data or historical data or combinations thereof. In embodiments the lane speed information is real-time lane speed information. Thus preferably the lane speed information is determined using, at least in part, and in some embodiments only, real-time data. By "real-time" it is meant that the data relates to traffic speeds at a time corresponding to, or within a small range of a current time at which the data is used to determine the timing for the lane instruction. The data should relate to traffic conditions at a time close enough to the time at which the timing is determined to be relevant to traffic conditions that will be encountered by the user of the navigation device when receiving the lane selection instruction, although there may be some delay between obtaining the data and its use to provide the lane guidance instruction such that the data may not exactly reflect current conditions when a lane instruction is given. Historical data is data that does not reflect real-time traffic speeds in a lane, but is based upon data relating to past traffic flows. Historical data may be used to provide an expected lane speed e.g. for a given time of day.

In some preferred embodiments in which the lane speed information comprises a lane speed profile, the lane speed profile is a real-time lane speed profile. In other embodiments the lane speed profile is a historic lane speed profile. In either of these embodiments the lane speed profile is preferably determined using vehicle probe data. The system e.g. a central controller thereof, may then comprise means for determining such lane speed profiles e.g. a set of one or more processors.

In accordance with the invention in any of its embodiments, the step of determining the lane speed information may comprise deriving lane speed information or may comprise obtaining lane speed information which has already been derived. The latter option is particularly applicable to embodiments using historic lane speed information. The method may comprise collecting data relating to the movement of vehicles along each lane and using the data to determine the lane speed information for each lane. In other embodiments, the step of determining the lane speed information may comprise obtaining lane speed information from historic lane speed information. The method may then comprise selecting lane speed information from among stored historic lane speed information.

In some embodiments in which the lane speed information is historical lane speed information, the method of determining lane speed information for a given lane may comprise determining historical lane speed information e.g. a historical lane speed profile for the lane. This step may be carried out by a central controller. This may be done by selecting historical lane speed information from stored historical lane speed information. In embodiments in which the lane speed information is a historical lane speed profile, the historical lane speed profile for a lane may provide a profile for the typical speed of travel of traffic along the lane. Lane speed will typically be dependent upon time, in particular time of day. In preferred embodiments, the determined historical speed profile for each lane is specific to a given time. The given time may be a specific time or a time range e.g. period. The method may comprise selecting a historic lane speed profile for a relevant time e.g. the current time. Preferably the given time is a time of day. It will be appreciated that lane speed profiles may alternatively or additionally be obtained for other specific times e.g. time of week, time of month, part of day, day of the week, week of the year, season, hour range, day range, minute range, particular hour etc.

It will be appreciated that a plurality of historic lane speed profiles may be stored for each lane relating to different given times, and the method may comprise selecting a historic lane speed profile from among a plurality of stored historic lane speed profiles for different given times, preferably times of day. Such a step may be carried out by the central controller. These may be obtained e.g. by using data relating to vehicles travelling along the lane at the given time to determine the historical lane speed profile. An average speed profile for a lane for a specified time range of interest may be obtained by aggregating individual vehicle speed data for the lane over the time range.

In some embodiments the method may further extend to the step of deriving a historical lane speed profile for each lane, and using the historical lane speed profile to provide the lane speed information. The historical lane speed profile may be determined in any of the manners described above. In embodiments a plurality of historical lane speed profiles are derived for each lane being specific to a plurality of different times, preferably times of day. These steps may be carried out by a central controller where present.

In accordance with any of its embodiments, the method may comprise determining lane speed information for each lane of the road section in the given direction of travel, and the system comprises means for carrying out such a step. In embodiments the method may comprise deriving lane speed information for a plurality of lanes of the road section having the same direction of travel for each direction of travel, and preferably for each lane in each direction of travel, and the system comprises means for so doing.

The lane speed information for each one of the plurality of lanes, and any additional lanes may be determined in the manner described in relation to any of the embodiments for determining lane speed information above. Thus the above techniques are applicable to determining lane speed information for the or each lane of the plurality of lanes. Of course, lane speed information for different lanes may be obtained in different manners.

The road section may be any part of a road which includes multiple lanes in at least one direction of travel. The road section could be the entire length of a road, or a part of the length thereof. For example, the road section could be a section between first and second interchanges. The road section may include multiple lanes along the entire length thereof or only a part, and may comprise multiple lanes in one or both directions of travel. In some embodiments the road section is a section of a road having at least two lanes in one or both directions along the length thereof, and preferably at least three. Such roads may be motorways. Lane structure information is typically more readily available for such roads. However, it will be appreciated that the section may be a section of a road which does not have multiple lanes other than in the section or sections concerned. In some embodiments the road section is a road section in the region of an interchange or intersection.

While the invention could be used to provide lane guidance over the entire lengths of roads, it is particularly applicable to providing lane guidance in specific road sections, for example where congestion is known to be problematic, where the lane arrangement is complex, in the vicinity of interchanges, exits, etc. The road section may be a section which is only temporarily problematic e.g. being a road section in the region of road works. The road section may fall within these criteria at all times, or only at a time when the lane guidance is provided. Applying the techniques of the invention to lane guidance in specific road sections may provide a balance between determining useful lane level guidance which may provide benefits when applied in the manners discussed below, and conserving processing power. The road section or sections may be selected as being road sections where it would be desirable for a navigation apparatus to be able to provide lane guidance to a user.

In some embodiments, the road section is a road section which may be considered regularly congested at least at a time when the lane guidance is provided. Any definition of a congested road section may be used. In some embodiments, the road section is a road section along which traffic flow speed has been found to regularly be less than a given threshold value of a maximum theoretical speed for the road section at least for a time period when the lane guidance is provided. For example, the threshold value might be 50% of the maximum theoretical speed for the road section at a given time. The level of congestion of a road section may be assessed using any type of traffic flow information for the road as a whole, or at least a given direction of travel. This traffic flow information need not be lane level information.

In some embodiments the road section is one or more of; a section of a road which has at least three lanes in each direction of travel, or a road section including or in the vicinity of one or more of; roadworks, a frequent accident hot spot, an exit or entry to a road, an intersection or interchange, a merger with a lane from another road, a splitting of a road, or a frequently congested section of road. Such possibilities are merely exemplary, and the methods of the present invention may be applied to any desired road section, for which it is deemed useful to provide improved lane guidance for any reason. The road section need not be a road section including a section of only a single road. The road section may include sections of more than one road, for example, including parts of roads meeting at an interchange etc. It is believed that the methods of the present invention may be applicable on a dynamic basis to provide lane guidance in road sections which are of interest at a given time.

The plurality of individual lanes of the road section are different lanes. In some embodiments the method further comprises using lane speed information in the form of lane speed profiles relating to two different lanes of the plurality of lanes to determine a speed difference profile between the two lanes. Such a step may be carried out by a central controller. In some embodiments the method further comprises using the lane speed difference profile to provide the lane guidance, and the system comprises means for so doing. Preferably the two lanes are adjacent lanes. The steps may be repeated for any pair of lanes of the plurality of lanes where the plurality of lanes for which lane speed information is determined comprise more than two lanes.

The method of the invention involves using the lane speed information to provide an instruction to the user of a navigation apparatus regarding a lane selection, and the system comprises means for so doing. The instruction is provided via the navigation apparatus. The navigation apparatus is a mobile navigation apparatus. In embodiments the navigation apparatus is located in a vehicle. The user may be a user travelling through the road section i.e. having a current position in the road section. The current location of the navigation apparatus corresponds to that of the user. The lane guidance preferably relates to a lane selection to be made in the road section. However, it is envisaged that the lane selection could be a selection to be made before or after the user or navigation apparatus passes through the road section. Likewise the lane selection instruction is preferably provided to the user as the user travels through the road section i.e. as the navigation apparatus passes through the road section. However, it could be provided before or after the user passes through the road section. Even in these situations the invention is of utility as the traffic conditions in the road section mean e.g. that it is more efficient to defer making a lane change until the user has travelled beyond the road section, or conversely to make the lane change before entering the road section e.g. if there is heavy traffic. The system may comprise the navigation apparatus.

The lane selection instruction is provided to the user via the navigation apparatus. The navigation apparatus may comprise means for or a set of one or more processors which determine any or all of the lane speed information, the lane selection instruction and the timing for providing the lane selection instruction. However, in preferred embodiments at least the step of determining the lane speed information may be carried out remote from the navigation apparatus, preferably by a central controller. In embodiments the method comprises the step of providing the lane speed information to the navigation apparatus e.g. transmitting the information to the navigation apparatus. The information may be transmitted from a central controller. The central controller may additionally determine the information. This may reduce the processing burden on the navigation device. The navigation apparatus may use the lane speed information to determine the timing for providing the lane selection instruction, and/or may determine the lane selection instruction. In other arrangements, the lane selection instruction and/or the timing for providing the instruction may be determined by a combination of the navigation apparatus and the central controller. In other embodiments the steps of determining the lane speed information and the timing for providing the instruction to the user may both be carried out remote from the apparatus. Any suitable arrangement may be used.

The method may comprise the navigation apparatus using the lane speed information to determine a timing for providing the instruction to the user and providing the instruction to the user. In some embodiments the method comprises the navigation apparatus receiving the lane speed information and using the lane speed information to provide lane guidance to the user. The method may then further comprise transmitting the lane speed information to the navigation apparatus. In other embodiments the navigation apparatus could determine the lane speed information. The system may comprise a navigation apparatus so configured. In yet other embodiments, the lane speed information could be determined by a combination of the navigation apparatus and a central controller, and may optionally involve the use of further apparatus.

In accordance with a further aspect of the invention there is provided a method of operating a navigation apparatus, the method comprising the navigation apparatus using lane speed information for each of a plurality of individual lanes in the same given direction of a multi-lane road section to determine a timing for providing a lane selection instruction to a user.

In accordance with a further aspect of the invention there is a navigation apparatus, the navigation apparatus being arranged to carry out the steps of; using lane speed information for each of a plurality of individual lanes in the same given direction of a multi-lane road section to determine a timing for providing a lane selection instruction to a user.

In these further aspects of the invention the apparatus may therefore receive the lane speed information or determine the lane speed information as discussed above. It will be appreciated that any of the further aspects of the invention may include any or all of the features of the invention described in relation to any other aspects and embodiments of the invention to the extent they are not mutually inconsistent therewith.

In accordance with the invention in any of its aspects, the method comprises providing at least one lane selection instruction to a user. The or each instruction may comprise an instruction to the user to change lane or to maintain a current lane. The method may comprise providing a sequence of lane selection instructions to the user.

It will be appreciated that in embodiments in which the lane selection instruction is a lane change instruction, the lane selection instruction may be an explicit lane change instruction, or may be a more general route instruction such as to take a particular exit which implicitly requires a lane change. For example, the lane to which the user is required to change may be an exit to the road they are currently following, and may ultimately become a part of a different road. An instruction to the user to take the next exit would therefore involve changing to the exit lane.

In embodiments in which the lane selection instruction is an instruction to change lane, preferably the lane speed information is determined at least for a current lane of travel and a lane to which the user is to be instructed to change. In embodiments lane speed information is determined additionally for any intervening lanes. In preferred embodiments lane speed information is determined for each lane in the given direction of travel. Such lane speed information may then be used to determine the timing of the lane selection instruction.

The lane speed information preferably relates at least to a portion of the or each lane which lies ahead of the user's current position. Thus the system may take into account lane speeds i.e. traffic flow rates in the road ahead to determine a timing for providing a lane selection instruction. Preferably the method comprises using lane speed information relating to a portion of the road section ahead of a current position of the user to determine the timing for providing the lane selection instruction.

The lane selection may be a lane selection required to follow a given route through the road section or part thereof. The given route may be a route calculated by the navigation apparatus. The destination may be a destination beyond the road section. For example, in order to follow a given route to a destination, a user may need to pass through the road section, and take a particular exit to reach the destination, or alternatively may need to negotiate an interchange. The route may be a route calculated by the navigation apparatus along which the navigation apparatus is guiding the user. In embodiments, at least a part of the road section is included in a calculated route along which the user is being guided by the navigation apparatus, and the lane selection is a lane selection required for the user to follow the route through the at least a part of the road section. In some embodiments the method may comprise calculating a route between a first location and a second location along which a user of the navigation apparatus is to be guided, the route including at least a part of the road section, and the lane selection is a lane selection required for the user to follow the route through the road section. The navigation apparatus may carry out the step of calculating the route.

In some embodiments the lane selection instruction may be an instruction to enable the user to pass through the road section, or at least a part thereof as quickly as possible. The determined timing for the lane selection instruction may then be a timing which is determined to result in the quickest travel through the road section. For example, the instruction may prompt the user to move to a lane which has a higher lane speed through the section, or to stay in a current lane for longer. An instruction to maintain a current lane may be provided at the earliest opportunity to avoid unnecessary or excessive lane changes by the user. The lane selection instruction may be one of a sequence of lane selection instructions required to provide a quickest route through the road section or a part thereof.

In some embodiments the lane guidance instruction is an instruction to take an exit lane. The exit lane could be an exit lane from an interchange or intersection.

In accordance with the invention the method involves determining a timing for providing an instruction to the user regarding the lane selection. Thus, the system takes into account the lane speed information for lanes of the road section in order to determine when to instruct the user to change or maintain lane. It will be appreciated that multiple instructions may be provided to a user regarding a given lane selection. In such cases, the method comprises using the lane speed information to determine a timing at least for providing the first instruction regarding the lane selection to the user.

In some embodiments the method may comprise providing a lane selection instruction which is an instruction to change lane, and the method comprises determining a timing for providing the lane selection instruction which increases the time for the user to perform the lane change. There are various situations in which this may be appropriate. The method may comprise providing a lane change instruction earlier than the instruction would otherwise be provided in response to the determined lane speed information. The timing may maximise the time available to make the manoeuvre. For example, an instruction to change from a current lane into an exit lane may be provided as soon as a previous exit is passed.

By way of example, a user travelling on the left side of the road as in the UK, may be following a middle lane, and needs to take a left hand lane to follow a particular exit needed to follow a given route. The user could move over to the left hand lane at any stage over a mile long stretch of road. However, there is heavy traffic in the user's current lane, such that the lane speed for the current lane is less than that for the lane to which the user is to change. The system may determine that the lane speed for the current lane does not significantly increase in the road section at least until after the exit. Thus the system may instruct the user to move over to the left lane at the earliest opportunity and may therefore provide the lane manoeuvre instruction earlier to allow greater time for the user to change lanes.

In some embodiments the method may comprise determining that a lane speed of a current lane is less than that of a lane to which the user is to change in order to follow a route, and determining a timing for providing the lane change instruction which increases the time available for the user to make the lane change. The method may comprise determining that the lane speed of a current lane remains less than that of the lane to which the user is to change at least until after the point at which the user must make the lane change in order to follow a given route. Thus, this may be until after the exit that the user must take to follow a route. The method may comprise determining that the lane speed of the current lane at least a given amount less than the lane speed of the lane to which the user is to change. Thus when the current lane speed is less than a threshold amount different to that of the lane to which the user is to change.

In other embodiments, it may be determined, for example, that although the user needs to move to a right hand lane in order to be able to continue straight ahead after an interchange, it is better not to do this immediately a direction indication suggests that a lane change will be needed, but instead to wait until after traffic in the right hand lane has left the road at an exit which results in a relatively lower lane speed for the right hand lane up to the exit.

In other embodiments the user may have the option of taking one of two exits to follow a route. The system may determine that lane speeds for the current lane will decrease significantly after the first exit. The method may then comprise instructing the user to change lane to an exit lane in time to take the first exit. This will enable them to avoid the slower traffic leading up to the second exit. In these embodiments the method also therefore comprises providing a lane change instruction relatively earlier than usual.

Conversely, in other situations it may be determined that a lane change instruction should be provided later than usual. For example, the system may determine that the lane to which the user is to be instructed to change has low speed just following an entry lane from a service station which is heavily used by trucks. Thus the method may comprise determining that the instruction to perform the lane change should be provided only after the lane speed in the lane to which the user is to change has started to increase once the trucks have filtered on to the lane.

In embodiments the timing of the lane selection instruction is a timing determined to provide a quickest travel time through at least a part of the road section. For example, a route through the road section may be determined that will provide the quickest route having regard to lane speeds. The timing of providing lane selection instruction may be selected to minimise the travel time through the section, e.g. by ensuring that the user makes any necessary lane selections to follow the quickest route at the optimal times. Thus the timing may be a timing determined to minimise or reduce a travel time through at least a part of the road section.

Another application of the invention may be to determine a timing for providing instructions regarding the selection of lanes when passing through an interchange or intersection. The method may comprise determining a lane having the greatest speed at the entry to the interchange, and a lane having greater speed at the exit of the interchange, and determining a route from the quickest lane at the entrance of the interchange to the quickest lane at the exit of the interchange. The lane selection instruction may therefore be a lane selection instruction to enable the user to follow the determined route. The quickest entry and exit lanes may be lanes on a route calculated by the navigation apparatus which is being followed.

In other embodiments the lane selection instruction may not necessarily be a lane selection instruction required for a user to follow a particular route e.g. to take an exit. The lane selection may be a lane selection to enable the user to pass an incident affecting one or more lanes, preferably as quickly as possible. The incident may be, for example, a lane closure, roadworks, or an accident ahead. The lane selection instruction may be an instruction to the user to change into a lane unaffected by the incident or to maintain a current lane if this is the optimal lane. Lane incidents typically have a significant effect on lane speeds for some distance leading up to the incident. Such problems are exacerbated as drivers may not know which lane is affected, and may try to repeatedly change lane. Often a lane which appears to be moving faster may be the affected lane necessitating additional lane changes in order to pass the incident. In accordance with some embodiments the lane selection is a selection to enable the user to pass an incident affecting one or more lanes, and the method comprises determining a timing for providing the lane selection instruction which enables the user to pass the incident most quickly.

While the use of real-time lane speed information is preferable in embodiments of the invention, it will be appreciated that traffic levels in lanes may follow similar patterns each day. Thus historical lane speed information may be used to determine the timing for a lane selection instruction, e.g. when to move to an exit lane, as congestion patterns may be generally predictable. The use of real time information is useful in providing lane guidance to negotiate incidents.

In embodiments the timing of the lane instruction is determined to provide a quickest route through at least a part of the road section, to increase the time available for a user to perform a lane change or to provide at least a part of a determined quickest route past an incident affecting one or more lanes. It will be appreciated that the lane selection instruction may be one of a sequence of lane selection instructions which together may provide a quickest route. The timing of each lane selection instruction may then be determined to provide a quickest route in embodiments. Thus by providing a quickest route, it is meant that the timing of a given lane selection instruction is chosen to provide a quickest route through a part of the road section associated with that lane selection.

The lane selection instruction may be of any form. For example, the lane selection instruction may be audible and/or visual. The lane selection instruction may be provided in the same manner as any other navigation instruction provided by a navigation apparatus. The method may comprise displaying the instruction on a display of the navigation apparatus. In some embodiments the method may comprise displaying the instruction on a displayed digital map, for example as a map enhancement.

It will be appreciated that other information may be used in addition to the lane speed information to determine the timing of the lane selection instruction. For example, information regarding lane usage restrictions for the road section, or information regarding lane manoeuvre restrictions for the road section etc may be taken into account. For example, in some road sections it may not be possible to change back to an first lane after moving into a second lane from the first lane e.g. when the second lane is an exit lane. In other arrangements, certain lanes may be specifically designated for certain types of vehicle.

References to road interchanges herein refer to any form of interchange. The interchange may include a roundabout, an intersection or combinations thereof.

The present invention may provide methods of operating a navigation system, and the system may be a navigation system.

The principles of the present invention are applicable to any form of navigation apparatus.

In accordance with any of the aspects or embodiments of the invention the apparatus may comprise a display for displaying a digital map to a user, a processor configured to access digital map data and cause a digital map to be displayed to a user via the display, and a user interface operable by a user to enable the user to interact with the apparatus. References to a processor may refer to a set of one or more processors.

One particular area of utility is in relation to portable navigation devices (PND). In embodiments, therefore, the navigation apparatus is an apparatus of a portable navigation device (PND). In accordance with a further aspect, the navigation apparatus referred to in the aspects and embodiments of the invention above is a portable navigation device (PND).

The invention is also applicable to navigation apparatus which is provided as part of an integrated navigation system. For example the apparatus may form part of an in-vehicle integrated navigation system. In accordance with another aspect of the invention, the navigation apparatus described herein may form part of a navigation system. The navigation system may be an integrated in-vehicle navigation system.

Regardless of its implementation, a navigation apparatus used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GPS (Global Positioning System) signal reception and processing functionality. The apparatus may comprise one or more output interfaces by means of which information may be relayed to the user. The output interface (s) may include a speaker for audible output in addition to the visual display. The apparatus may comprise input interfaces including one or more physical buttons to control on/off operation or other features of the apparatus.

In other embodiments, the navigation apparatus may be implemented by means of an application of a processing device which does not form part of a specific navigation device. For example the invention may be implemented using a suitable computer system arranged to execute navigation software. The system may be a mobile or portable computer system e.g. a mobile telephone or laptop, or may be a desktop system.

The present invention extends to a computer program product comprising computer readable instructions executable to perform a method according to any of the aspects or embodiments of the invention, or to cause a navigation apparatus to perform such methods.

As discussed above the steps involved in determining the lane speed information and/or obtaining lane speed profiles may be carried out by a central controller, in any of the embodiments of the invention. Any or all of the steps said to be carried out by a central controller may all be carried out by the same central controller.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Some preferred embodiments of the invention will now be described by way of example only, and with reference to FIGS. 1-6. The description with respect to FIGS. 1-4B provides background information to facilitate understanding of the invention in its various embodiments. The embodiments of the invention are described by reference to FIG. 5 onward.

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
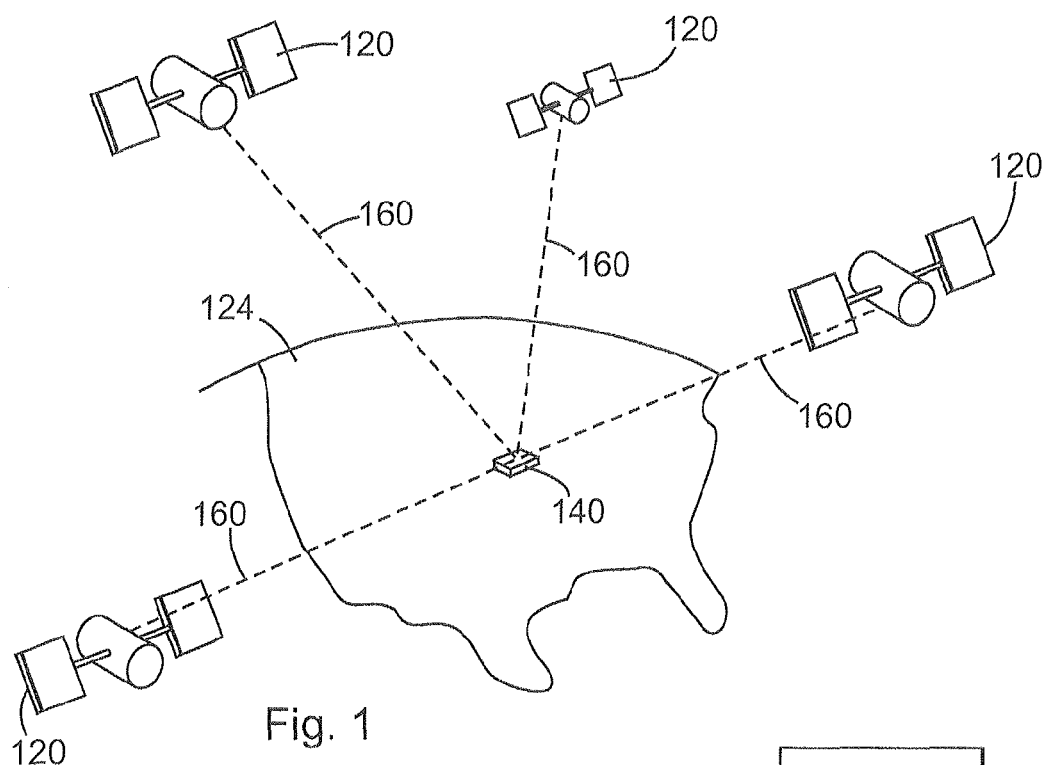
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
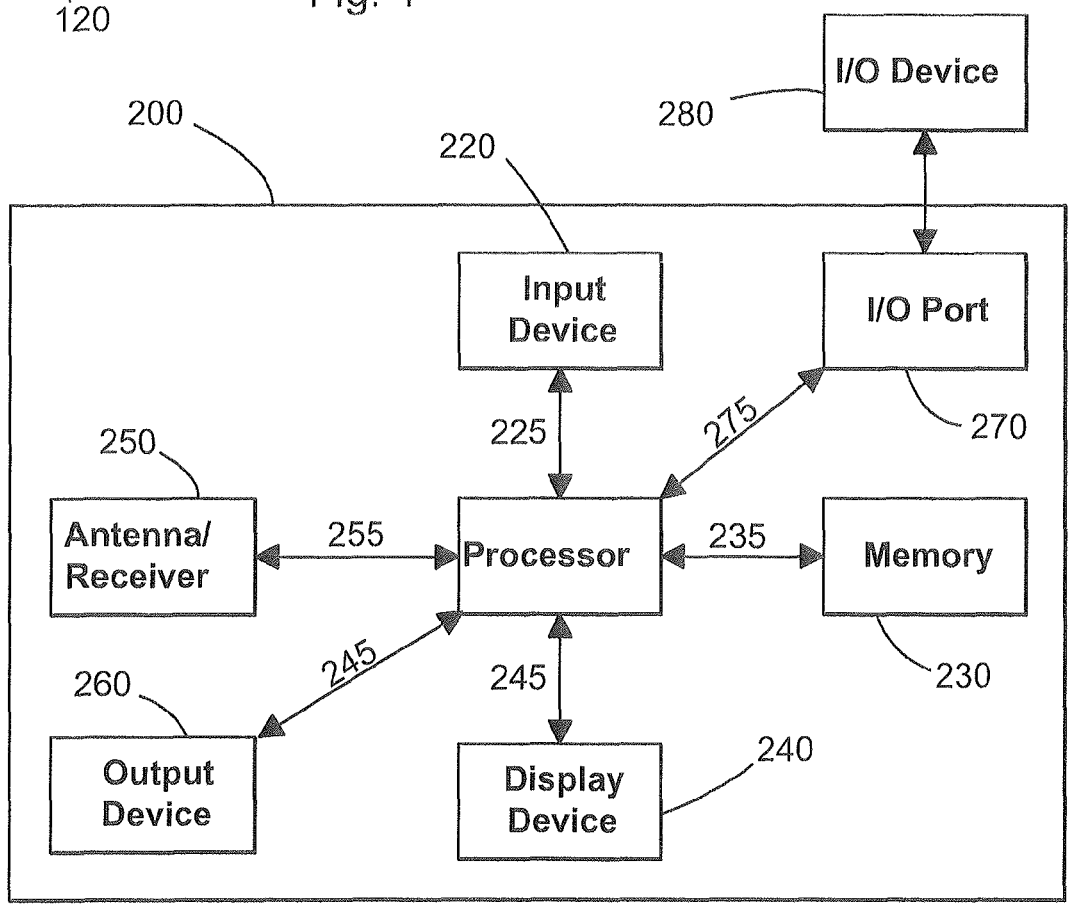
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
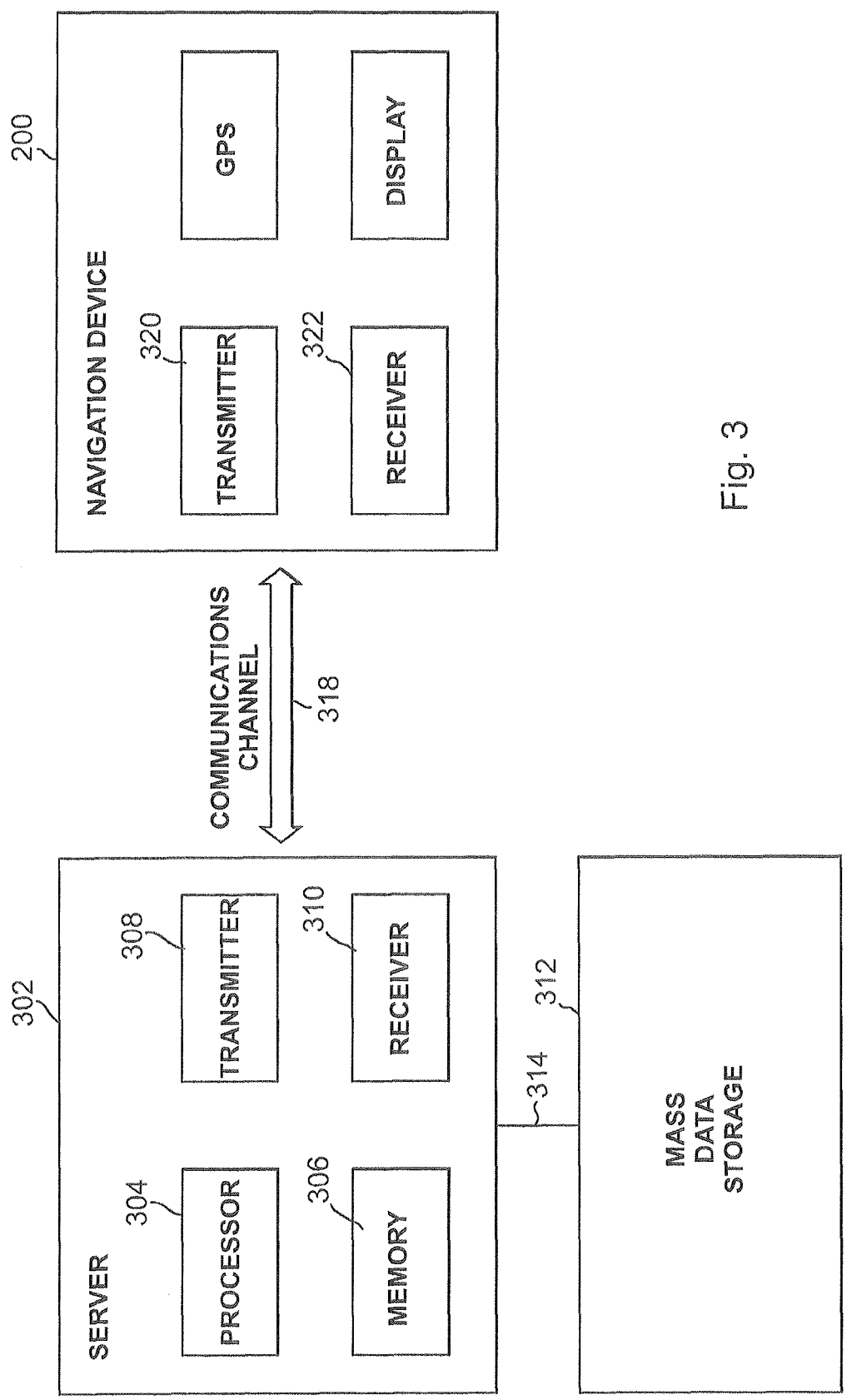
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GPRS, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
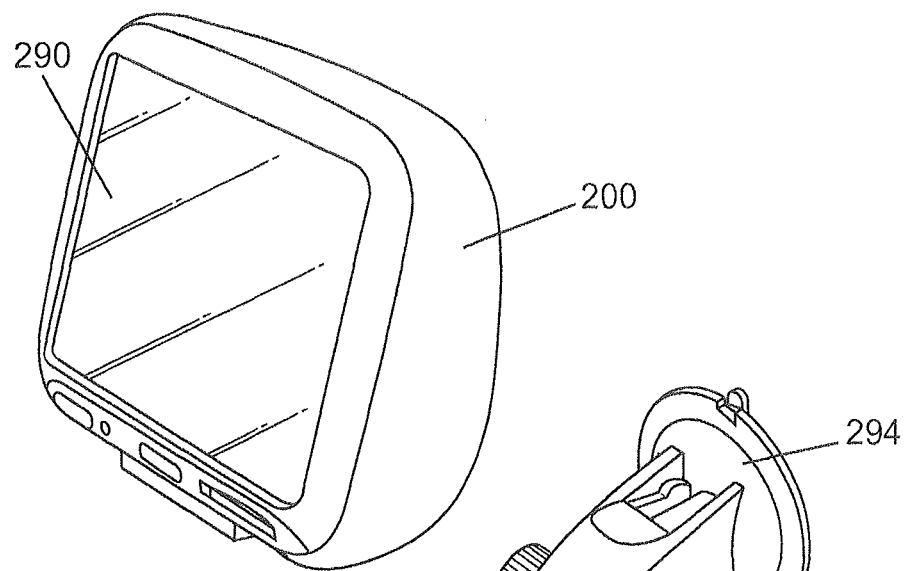
FIGS. 4A and 4B are illustrative perspective views of a navigation device.
Figure 4B:
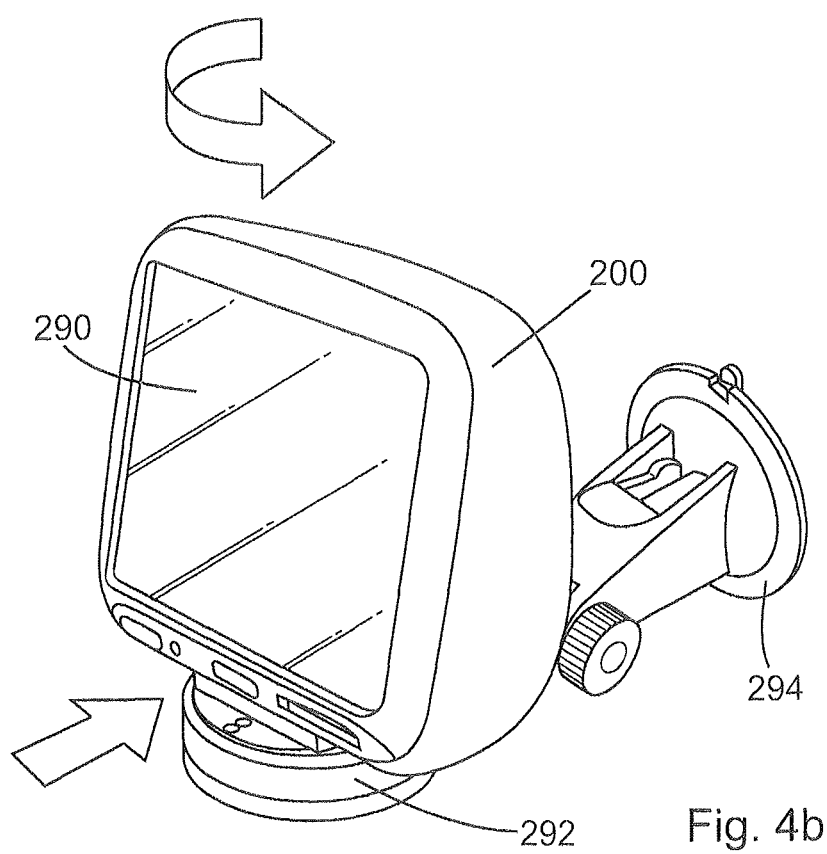

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

The present invention involves using lane speed information to determine a timing for providing a lane selection instruction to a user of a navigation apparatus. The lane speed information may be of any type, and may be based on real time or historic lane speed data, or combinations thereof. In some embodiments the lane speed information is in the form of lane speed profiles. While the exemplary embodiments are described by reference to the use of lane speed profiles based upon vehicle probe data, it will also be appreciated that other types of data may be used to determine speed information. For example data obtained from conventional lane speed sensing equipment such as fixed sensors e.g. loops, cameras etc., may be used.

Some exemplary embodiments regarding the way in which lane speed information in the form of historical lane speed profiles may be determined using vehicle probe data will now be described, before exemplary uses of the lane speed profiles are described.

The method may first involve a step of identifying a road section for which historic lane speed profiles are to be derived. The road section is a road section with at least one carriageway having at least two lanes. By a carriageway, it is meant the part of the road for travel in a single direction. Thus a two-way road includes two carriageways, each of which may comprise one or more lanes. The selection of the road section may be carried out in any manner.

The techniques of the invention are particularly applicable to road sections which are often susceptible to congestion. One way of identifying such road sections may be to consider the traffic flow speeds on road sections compared to a maximum theoretical speed for the road section. For example, road sections may be selected which are found to have traffic flow speeds at or lower than 50% of a maximum theoretical speed for the road section on the basis of traffic data such as TomTom's HD Traffic™ data. This may be by reference to the level of congestion for the road section, or a carriageway thereof as a whole, rather than by consideration of lane level traffic speeds. Other definitions of a congested or semi-congested road can of course be used. Rather than considering road sections that are susceptible to congestion, road sections may alternatively or additionally be chosen as they include an interchange, intersection, complicated lane structure, one or more entries or exits, roadworks, accident hotspots, roads merging or splitting etc, or any road section where it may be advantageous to obtain lane level speed information to be able to provide enhanced guidance to users of navigation devices. Such road sections may be road section where there are often significant differences in speed profile between different lanes in the same direction.

The vehicle probe data for the selected road section is first collected. In some preferred embodiments of the invention, the data is collected at a central controller for processing at the central controller to obtain historical lane speed profiles. However, it is envisaged that data could be collected and/or processed at individual PND's in other embodiments. The location at which data is collected and/or processed is not significant.

Vehicle probe data may be obtained from any suitable source, such as using a GPS and/or GSM probe collection system. The Applicant's HD Traffic™ systems use vehicle probe data to provide accurate traffic flow information at a road level. In embodiments of the present invention, vehicle probe data is instead used to determine lane level traffic flow information. The core sources of probe data are cell phone operators in various countries as well as GPS probes from suitably connected vehicle based navigation apparatus, or commercial fleets with appropriate sensors.

Probe data relating to the movement of individual vehicles along lanes in the road section is collected. This may be in the form of individual vehicle probe traces per lane i.e. longitudinal traces representative of the position of vehicles with respect to time along the length of the lane. The probe data should have a resolution i.e. points per minute sufficient to enable accurate speed data for individual vehicles to be determined at a lane level of resolution. It has been found that use of probe data with probe points at least every second may be appropriate to allow vehicle speeds to be accurately determined.

The probe data for the road section is collected for a specific time of day. For example data may be collected over a time period of one minute on a particular day to obtain a particular historic lane speed profile. Additional sets of probe data for other time periods may then be obtained to build up a set of historic lane speed profiles for different times over an entire day, and for each day of the week.

Individual vehicle speeds obtained by consideration of individual vehicle probe traces are aggregated to obtain an average lane speed profile for the time period. The lane speed profile may be validated over time.

Lane speed profiles may be calculated using the probe data in a similar manner to the way in which road speed profiles are calculated, for example as described in the Applicant's WO 20091053405A1.

Some examples of how lane speed profiles can be calculated using vehicle probe data will now be described. In an exemplary embodiment it is assumed that the vehicle speeds over the road section are constant over a period of one minute. Vehicle probe traces i.e. longitudinal traces formed by probe position data over time for individual vehicles, are collected over a 60 second time domain for the road section. Probe traces may be allocated to sub-groups having different speed categories on the basis of the vehicle speeds indicated by the probe traces. The sub-groups may be matched to different lanes, by consideration of the position of the traces with respect to the width of the road section, as described below. In this way a speed per lane value may be determined. This may be carried out along the length of a lane to obtain an overall lane speed profiles. In some embodiments a speed difference or a speed variance between different lanes may be determined.

It will be appreciated that in order to derive lane level speed profiles it is necessary to determine which probe data relates to which lane i.e. in which lane individual probe vehicles are travelling. There are various ways of doing this. With sufficient probe points densities with respect to time, a position accuracy for probe vehicles of up to 1 m can be obtained. GNSS constellations currently in development are expected to be able to provide even higher levels of positioning accuracy which will still further improve the precision with which probes can be matched to lanes. Thus with knowledge of the lane structure of a road section it is possible to determine to which lane a probe vehicle belongs. This may be done by reference to map data describing the lane structure of road sections i.e. the number of lanes and the width of the lanes in each carriageway.

Map data should be used which is accurate in terms of the number of lanes in a road section, as well as the lane width and the beginning and ending of the lanes. The invention is particularly applicable to motorway type roads where lane structure information to a high degree of accuracy is already known from a variety of sources. For example, PND devices may rely upon such data to provide instructions to a user as to which lane to select to follow a particular route, e.g. to ensure that they will ultimately end up in an exit lane at the next interchange. Advanced Driver Assistance Systems (ADAS) quality maps may provide such levels of accuracy for different road types.

Rather than relying upon map data to provide lane information, it has been found that in alternative techniques, the vehicle probe data itself can provide information regarding the lane structure of a road section. This may enable lane speed profiles to be determined without reliance upon third party map data, for example. This may be done by reference to a distribution of probes across the width of the road.

A historic lane speed difference profile may also be determined for the speed difference between lanes.

Once calculated the historical lane speed profiles determined may be stored in a database, together with any historic lane speed difference profiles determined. The speed profiles may be stored by the central controller. The historical lane speed profiles may be stored in conjunction with a time of day to which the profile applies, and information identifying the lane to which it relates. It is envisaged that historical lane speed profiles may be determined for a range of different times of interest to ensure that there are speed profiles available from which a profile which may provide a reasonable match to the current conditions a user of a navigation apparatus may expect to encounter can be selected.

Currently speed profiles for roads as a whole, rather than lane level speed profiles may be determined for example, for 5 minute intervals on everyday of the week in the TomTom Traffic™ system. Similar numbers of historical lane speed profiles could be derived in accordance with the invention. Alternatively, historical lane speed profiles could only be derived for certain parts of the day where congestion is known to be more of a problem, and when detailed knowledge of traffic levels per lane may provide greater benefits.

Once the lane speed profiles have been obtained, a suitable algorithm may be run on the data to determine a lane selection instruction, and a timing for providing the lane selection instruction to a user of a PND. Such an algorithm may be run by an individual PND, or at a central traffic centre e.g. by a central controller. Where the instruction and/or timing is determined centrally, the instructions e.g. a lane recommendation, and/or timing for providing a lane selection instruction may be transmitted to an individual PND for conveying to a user.

While embodiments relating to the determination of historic lane speed profiles based on vehicle probe data have been described, as mentioned above, the invention is not limited to the use of lane speed profiles of this type. By way of example, in addition or alternatively to using historic vehicle probe data, real-time vehicle probe data may be used. The methods for deriving lane speed profiles using real-time vehicle probe data, or mixtures of historical and real-time vehicle probe data may proceed in a similar manner to the methods described by reference to historical lane speed profile determination. Rather than using vehicle probe data, or at least solely using such data, other types of vehicle speed data may be used, alone or in combination with vehicle probe speed data.

In accordance with the invention, lane speed information may be used in a number of ways to determine lane guidance instructions and a timing for providing the instructions to a user of a PND.

Figure 5:
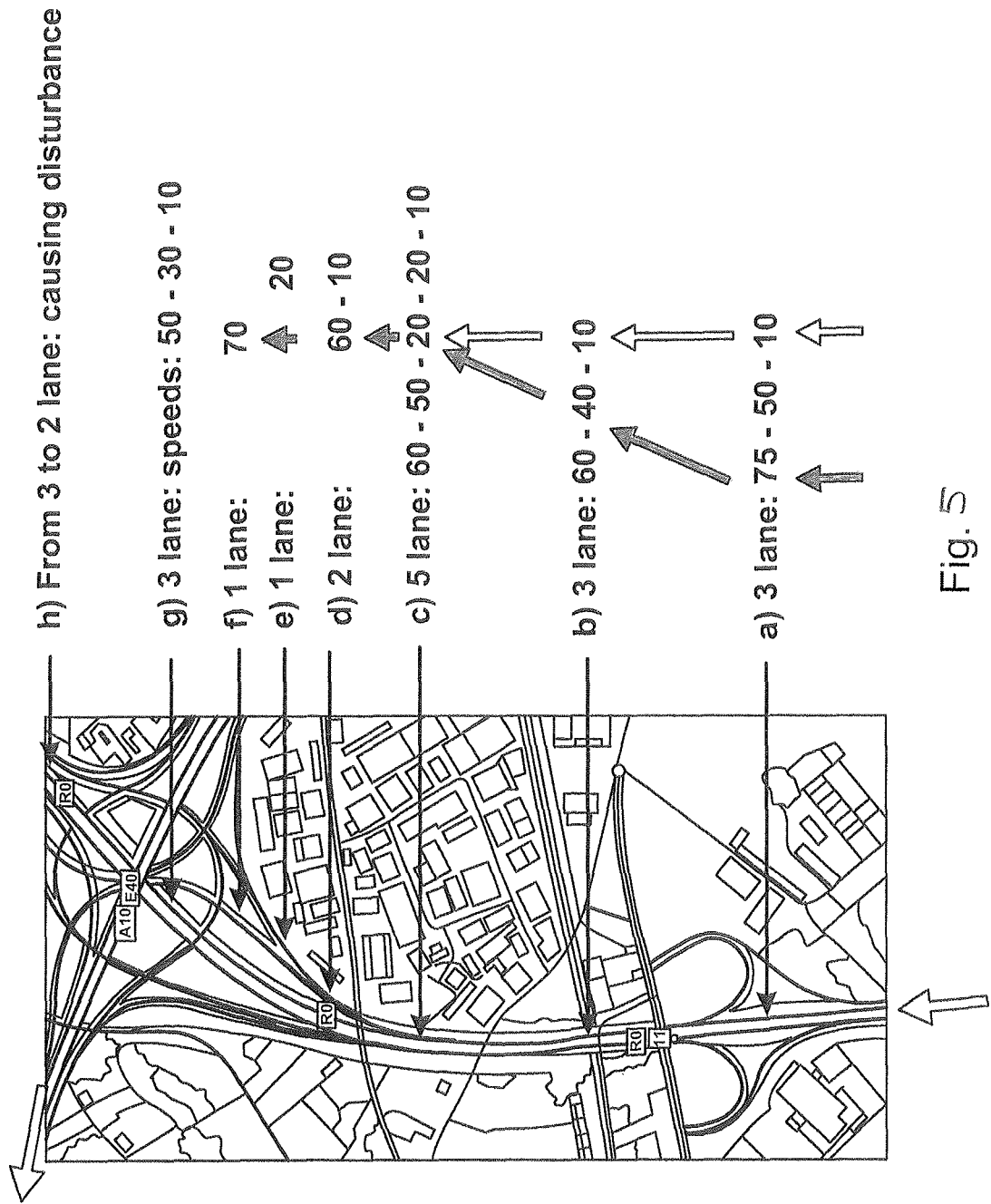
FIG. 5 illustrates variations which may occur in historic lane speed profiles in a complex road section.
Figure 6:
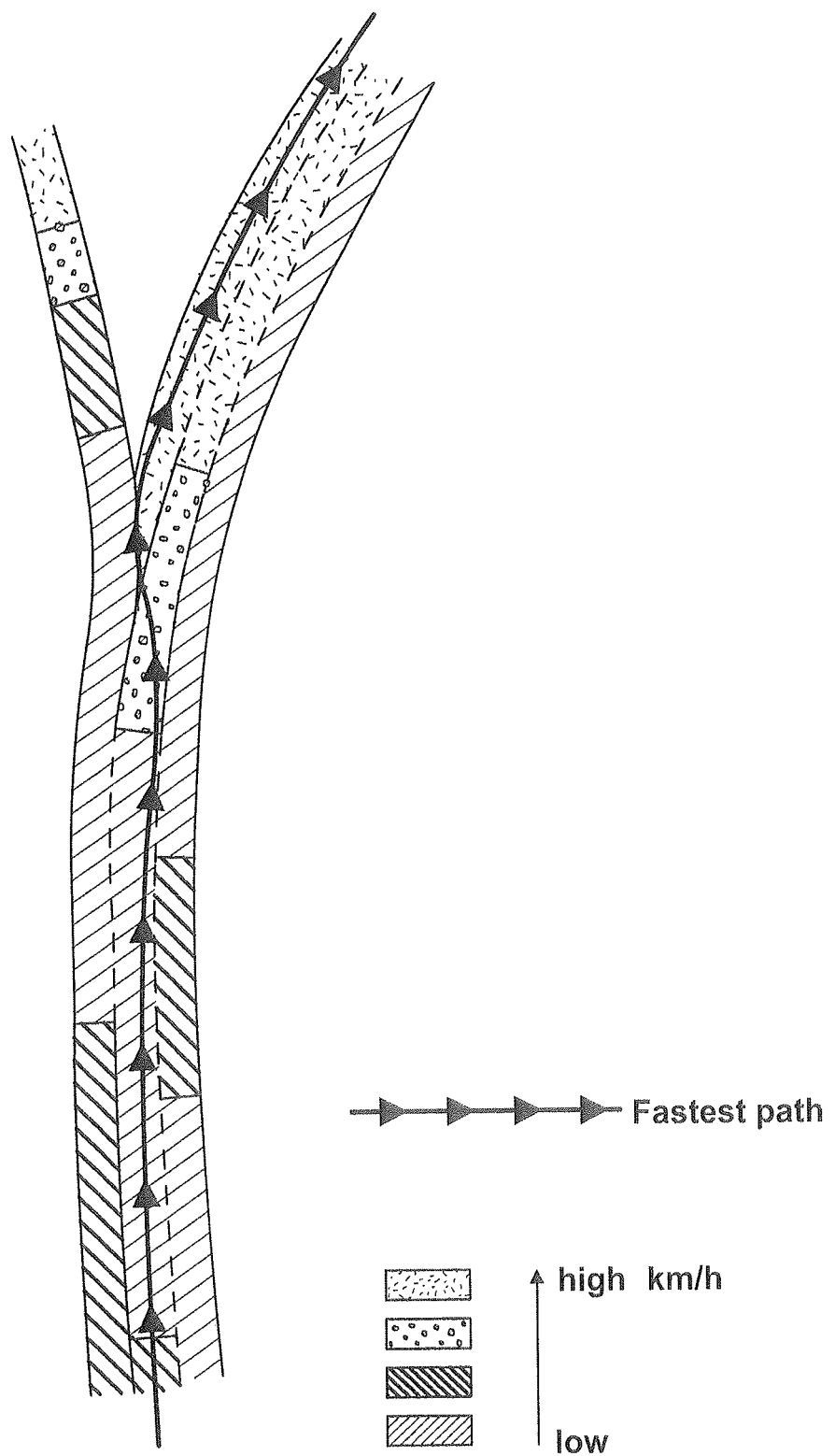
FIG. 6 illustrates variations in historic lane speed profiles occurring in a road section including a left hand exit.

Some examples will now be described in relation to lane speed information in the form of lane speed profiles. FIGS. 5 and 6 illustrate scenarios which use lane speed information in the form of historical lane speed profiles. However, they could equally be implemented using lane speed profiles based in whole or in part upon real-time data.

To illustrate the significant variation in speed profile which may occur between lanes of a road section we will now refer to FIG. 5. This may provide an example of the context in which it may be useful to provide improved lane level guidance, and the benefits that may be provided by determining lane selection instructions and timings therefor in accordance with the invention.

FIG. 5 shows a road section including an interchange and a number of entry and exit roads to a main road, the RO road. In this illustration, travel on the right-hand carriageway is assumed. This road section is part of the Brussels ring road, in the region of Groot Bijgaarden.

The direction of travel in this case is from the bottom to the top of the Figure as indicated schematically by the arrows. The arrows indicate paths through the lanes which may be taken by a vehicle wishing to travel along the R0 road before taking a left hand turn onto the A10/E40 road toward Ghent as shown.

This road section includes a number of features which may influence lane speed. Starting from the bottom of the Figure, and considering a direction of travel according to the arrows from the bottom to the top of the Figure, in region a) there are three lanes in the main road, the R0. In this region typical lane speeds might be 75 kilometers an hour, 50 kilometers and hour and 10 kilometers an hour respectively for the left, middle and right hand lanes. At section b), typical lane speeds are 60 kilometers an hour, 40 kilometers and hour and 10 kilometers an hour for the left, middle and right-hand lanes. At section C, there are five lanes having typical speeds of 60 kilometers an hour, 50 kilometers an hour, 20 kilometers an hour, 20 kilometers an hour and 10 kilometers an hour from the left-hand lane towards the right-hand lane.

In the region of point d), the road divides, and the section leading towards the left-hand turn onto the A10/E40 has only two lanes, with typical lane speeds of 60 kilometers an hour and 10 kilometers an hour for the left and right lanes. Moving on to point e), this section includes only one lane along the desired route, with a typical lane speed of 20 kilometers an hour. Once section f) is reached, lane speeds increase again towards 70 kilometers an hour. At section g), there once again are three lanes, having lane speeds 50 kilometers an hour, 30 kilometers and hour and 10 kilometers an hour from left to right. At point h) the carriageway decreases from three lanes to two lanes, again causing disturbance.

It will be seen that there are therefore some significant differences between the lane speeds over the road section shown in FIG. 5. These arise for a number of different reasons. For example at point e), there is only one lane with a low lane speed. This is a point just before an exit leading to Brussels which has limited capacity. It may be seen that the lane divides just after point e), with one lane continuing towards the E40 road and another branching off towards the right, towards Brussels. Once the lane division has occurred, at point f) on the main R0 road, lane speeds increase again. In region h), traffic speeds in the lanes will decrease as the carriageway changes from three lanes to two lanes, with the left-hand lane merging and disappearing.

While typical traffic flow data for carriageways as a whole would simply show that the entire road section was congested, the lane level analysis of FIG. 5 shows that it is primarily the right-hand lanes which are congested in the carriageway. The knowledge of the typical lane speeds may be used to provide guidance to a driver of a vehicle wishing to travel along the road section via a PND. The lane speed information may be used to determine a lane selection which will provide the fastest route through the road section.

In this example, a driver is initially at point a). In order to take the left-hand turn onto the E40/A10 just after point g), the driver will need to be in a lane to the right hand side of the carriageway by around section c). Using the lane speed information provided by lane speed profiles, it is apparent that there is no point in the driver moving over to the right-hand lane too soon, for example by point b), as the right-hand lane is moving very slowly in this section. Instead a lane selection instructions may be provided to the driver to stay in the left hand lane until after point a), to move to the middle lane by section b), and then by section c) move over to the third lane from the left which may lead to the desired exit.

In this instance, it is determined that in order to provide the fastest route through the road section, it is appropriate to defer providing a lane selection instruction to a driver initially in the left hand lane to make the lane change needed to enable them to follow their route in order to reduce the amount of time spent travelling in the slow right-hand lane. The recommended lane selection is indicated by the solid left-hand set of arrows between sections a), b) and c) in FIG. 5, while the right hand set of arrows show the considerably slower lane speeds associated with taking the right hand lanes through sections a), b) and c) through this section.

This illustration shows how detailed information regarding the lane speed profiles for the lanes of a road section may be used to provide a timing for providing instructions to a driver via a PND of the most appropriate lane selection for example to provide a fastest route through the road section. The lane selection instruction may be an instruction to a user to make a lane change necessary to follow a particular route. For example this is the case in the FIG. 5 illustration, as the user initially in the left hand lane at point a) needs to move to a right-hand lane in order to take the correct exit towards Ghent. In other arrangements, the lane selection instruction could be an instruction to keep lane. In other embodiments a lane selection may be provided to user simply to provide a quicker passage through the road section, rather than to follow a given route.

FIG. 6 illustrates another example of the way in which lane speed profiles may vary. Typically, in countries where a direction of travel is on the right-hand side of a road, the convention is that the innermost lane, i.e. the left-hand lane, will be the fastest for a given carriageway. In some situations, travel may be faster in a middle lane rather than a left lane as is the convention. This may be the case for example when trucks move over to the left in order to take an exit requiring them to be in a left-hand lane. Once the exit has been passed, the left lane may once again become the fastest lane. Lane speed profiles may reveal such situations, enabling improved lane recommendations to be made for faster travel.

The illustration with respect to FIG. 6 shows an example of such a scenario FIG. 6 illustrates a possible lane speed profile for the right hand carriageway of a road section approaching the Kennedy Tunnel (Antwerp) from Ghent. The difference in the type of shading in various lanes illustrates the relative speeds of traffic flow in different lanes. This road section, starting from the bottom of the illustration includes three lanes in the main carriageway. A left-hand exit then branches off, with the left-hand lane of the initial carriageway dividing to provide this exit lane. The main carriageway then continues with three lanes in the right-hand branch.

It would normally be expected that the left-hand lane would be the fastest lane. This is the inside carriageway for travel on the right-hand side of the road. However, it may be seen that traffic flow speeds in the left-hand lane are in fact lower than those in the middle lane in the region before the left-hand exit. This is because on this particular road section, slow moving trucks tend to move over to the left-hand lane in preparation for taking the left-hand exit. Thus, for a driver wishing to take the main carriageway straight ahead, the fastest lane selection would be stay in the middle lane until just past the left-hand exit, before moving to the left-hand lane again. This is shown by the solid line with arrows indicating the travel of a vehicle according to the preferred lane selection for fastest travel.

In this situation, the PND provides a lane selection instruction which will provide the fastest journey though the road section, rather than being one that is essential to follow a route e.g. to make a particular exit. In this instance, the PND will defer providing a lane instruction to the user to move from a middle lane to a left-hand lane until after the left-hand exit, determining that this is the appropriate timing using the lane speed profiles.

A lane selection recommendation may take into account other factors. For example in the illustrated section of road, there is a firm lane divider between the left-hand and middle lanes. Thus, if a driver moves too early to the left hand lane they will not be able to return to the left-hand lane. This may be taken into account when providing a recommended lane selection to a driver. This factor again makes it preferable to select the middle lane in the region before the left-hand exit to avoid being stuck in slow moving traffic as trucks take the left exit.

Accordingly, it may be seen that the methods in accordance with the invention may enable more useful guidance to be provided to a driver via a navigation apparatus e.g. PND than simply to keep to a left-hand lane (for travel on the right-hand side of a road) in order to provide a fastest journey time. The PND may determine a lane selection through a road section, or along a route being navigated to result in the fastest travel along the route or through the road section, based e.g. on lane speed profile data, effectively resulting in local information regarding usual conditions being taken into account. The system uses the information to determine when to provide instructions to a user via a PND regarding a lane selection e.g. when to perform a lane manoeuvre i.e. to change lane, or when to maintain a current lane.

The Applicant has found that in particular in complex road sections where there are exits, entries, regulations and incidents, traffic flow speeds in different lanes may vary considerably, for example due to merging lane situations, temporary lane closures, exits that take the pressure out of the lane, truck overtaking prohibit situations, and incidents e.g. temporary lane closures. The method of the present invention enables a driver to be guided in a manner which may increase their rate of travel through such road sections.

Some other applications of the methods of the present invention will now be described.

In addition to or alternatively to providing a recommendation to a user to change lane, a user may be provided with a recommendation to maintain a current lane. For example this might be the case in relation to the FIG. 6 illustration. Towards the bottom of the road section illustrated, the user may be provided with an instruction to maintain travel in the middle lane to prevent them moving over to the left-hand lane too soon. The system may determine a timing for providing such an instruction based on the fact that there is slower moving section of traffic in the left-hand lane in the run-up to the left exit. This may not be visible to the driver when they first enter the road section. Providing instructions to keep lane may also be used to help to reduce the occurrence of congestion waves, but in a more tailored and accurate manner than current basic instructions to keep lane that may be provided by a traffic centre.

Another example of a situation in which the methods of the present invention may be of benefit is where a user needs to take a given exit e.g. a left hand exit in order to follow a planned route. Lane speed information may reveal that the driver's current lane is likely to have a relatively low lane speed up to and past this exit. The PND may then provide an instruction to the driver to move into the left-hand lane comparatively soon in order to maximise the time for them to make the lane change, given the difficulties resulting from the relatively slow traffic speed in their current lane.

Another application of the invention may be to determine a timing for providing instructions regarding the selection of lanes when passing through an interchange. The system may determine the lane having the greatest speed at the entry to the interchange, and the lane having greater speed at the exit of the interchange. A lane selection may be calculated providing the most efficient route from the quickest lane at the entrance of the interchange to the quickest lane at the exit of the interchange. The lane selection may be illustrated to the user via a display of the PND with a suitable graphical illustration. The PND may inform the user when to change lane in order to result in the most efficient passage through the interchange.

Rather than providing instructions for a lane selection recommendation to result in a fastest route through a road section, or a fastest travel time along a route including the road section, other criteria could be taken into account. These criteria may be user specified criteria. For example, a user may specify that they do not wish to exceed a particular speed, or would prefer to be in a slower lane, one less heavily used by trucks etc. A suitable lane selection may be then provided to the user using the lane speed profiles, and suitable timings determined for providing instructions regarding the necessary lane selection to meet specified criteria.

The methods and systems of the present invention may provide improved levels of safety, by providing drivers with lane guidance at the most appropriate time. The methods may also provide greater efficiency, by providing the ability for a user to select a most appropriate lane at an earlier stage, and keep to this lane, reducing the number of unnecessary lane changes, providing potential traffic flow improvements. This may also improve the fuel efficiency of driving, providing improved environmental benefits. Travel speeds may be enhanced by drivers making an optimal lane selection at an optimal timing according to particular criteria.

Lane selection instructions may be provided to users via a PND in any manner, for example using audio or visual type instructions. Lane selection guidance may be similar to the guidance which is currently offered regarding the selection of a lane at an interchange to reach an appropriate destination.

While the invention has been described in relation to PND navigation devices, it will be appreciated that the invention is equally applicable to providing guidance via other types of navigation apparatus, including, for example, integrated in-vehicle navigation systems.

In preferred embodiments deriving of lane speed information e.g. lane speed profiles is carried out by a central controller. Determining of timing for lane guidance instructions may be carried out by the navigation apparatus and/or the central controller. The lane guidance instructions may be generated by the navigation apparatus.

A lane is a part of a carriageway of a road which is intended to be used by a single line of vehicles. A road will typically have at least two lanes, one for travel in each direction. Major roads may have more than one carriageway separated by a median, each of which may have multiple lanes. Lane changes occur during overtaking manoeuvres, or may occur in order to follow a given route e.g. to take an exit lane etc. Lane usage varies in different regions of the world. For example, in continental Europe the left hand lane is intended to be a fastest lane, while overtaking is normally carried out by passing a slower vehicle on its left side. The reverse applies in the UK where travel is on the left hand carriageway for a given direction of travel. In the US, drivers should stay in their given lane, which means that the left lane is not necessarily fastest. The lane guidance of the invention may be used for different purposes in different regions, depending upon local lane usage rules or customs.

The invention claimed is:

1. A method, comprising:
determining, by one or more processors, lane speed information for each of a plurality of individual lanes of a multi-lane road section, wherein the plurality of individual lanes are lanes for a given direction of travel;
using, by the one or more processors, the lane speed information to determine a timing for providing a lane selection instruction to a user of a navigation apparatus, wherein said determining comprises determining a particular time at which the lane selection instruction is to be provided to the user to provide the lane selection instruction earlier than it would otherwise be provided, and wherein the lane selection instruction is at least one of: (i) an instruction to change lane; (ii) a lane selection required to follow a given route to a destination; (iii) an instruction to take an exit; (iv) a lane selection to enable the user to pass an incident affecting one or more of the lanes; and (v) a lane selection which is determined to provide a quickest route through at least a part of the road section; and
providing, by the one or more processors, the lane selection instruction to the user based on the determined timing.

2. The method of claim 1, wherein the lane speed information is determined, at least in part, using real-time data.

3. The method of claim 1, comprising using vehicle probe data to determine the lane speed information for each said lane.

4. The method of claim 1, wherein the lane speed information for each lane comprises a lane speed profile for each lane.

5. The method of claim 1, further comprising using lane speed information in the form of speed profiles for two different lanes of the plurality of lanes to determine a speed difference profile between the two lanes, and using the speed difference profile to determine said timing.

6. The method of claim 1, wherein the lane selection instruction is a lane change instruction, and the method comprises using lane speed information relating at least to a current lane and a lane to which the user is to change to determine said timing.

7. The method of claim 1, comprising using lane speed information relating to at least to a portion of the road section ahead of a current position of the user to determine the timing for providing the lane selection instruction.

8. The method of claim 1, wherein the road section includes or in the vicinity of one or more of: roadworks, a frequent accident hot spot, an exit or entry to the road, a splitting of a road, a merging of a road with a lane from another road, an interchange or intersection, and a frequently congested section of road.

9. The method of claim 1, comprising determining lane speed information for each lane of the road section in the given direction of travel.

10. A navigation apparatus, comprising:
memory comprising map data including a plurality of multi-lane road sections and lane speed information for at least one of the plurality of multi-lane road sections; and
at least one processor, wherein the at least one processor configured to:
use lane speed information for each of a plurality of individual lanes in the same given direction of a multilane road section to determine a timing for providing a lane selection instruction to a user, wherein said determining comprises determining a particular time at which the lane selection instruction is to be provided to the user to provide the lane selection instruction earlier than it would otherwise be provided, and wherein the lane selection instruction is at least one of: (i) an instruction to change lane; (ii) a lane selection required to follow a given route to a destination; (iii) an instruction to take an exit; (iv) a lane selection to enable the user to pass an incident affecting one or more of the lanes; and (v) a lane selection which is determined to provide a quickest route through at least a part of the road section; and
provide the lane selection instruction to the user based on the determined timing using an output device of the navigation apparatus.

11. The method of claim 1, wherein the navigation apparatus is a portable navigation device (PND) or wherein the navigation apparatus forms part of an integrated navigation system.

12. The navigation apparatus of claim 10, wherein the navigation apparatus is a portable navigation device (PND) or wherein the navigation apparatus forms part of an integrated navigation system.

13. A non-transitory computer readable medium comprising computer readable instructions which, when executed by a computer, cause the computer to perform a method comprising:
determining lane speed information for each of a plurality of individual lanes of a multi-lane road section, wherein the plurality of individual lanes are lanes for a given direction of travel;
using the lane speed information to determine a timing for providing a lane selection instruction to a user of a navigation apparatus, wherein said determining comprises determining a particular time at which the lane selection instruction is to be provided to the user to provide the lane selection instruction earlier than it would otherwise be provided, and wherein the lane selection instruction is at least one of: (i) an instruction to change lane; (ii) a lane selection required to follow a given route to a destination; (iii) an instruction to take an exit; (iv) a lane selection to enable the user to pass an incident affecting one or more of the lanes; and (v) a lane selection which is determined to provide a quickest route through at least a part of the road section; and
providing the lane selection instruction to the user based on the determined timing.

14. The non-transitory computer readable medium of claim 13, wherein the lane speed information is determined, at least in part, using real-time data.

15. The non-transitory computer readable medium of claim 13, further comprising using lane speed information in the form of speed profiles for two different lanes of the plurality of lanes to determine a speed difference profile between the two lanes, and using the speed difference profile to determine said timing.

16. The non-transitory computer readable medium of claim 13, wherein the road section includes or in the vicinity of one or more of: roadworks, a frequent accident hot spot, an exit or entry to the road, a splitting of a road, a merging of a road with a lane from another road, an interchange or intersection, and a frequently congested section of road.

* * * * *